United States Patent
Kisban et al.

(10) Patent No.: US 11,181,408 B2
(45) Date of Patent: Nov. 23, 2021

(54) THERMORESISTIVE GAS SENSOR

(71) Applicant: Siemens Aktiengesellschaft, Munich (DE)

(72) Inventors: Sebastian Kisban, Munich (DE); Stefan Klehr, Rheinzabern (DE); Thomas Neuhauser, Bartlesville, OK (US); Piotr Strauch, Rülzheim (DE); Jörg Zapf, Munich (DE); Jürgen Zettner, Veitsbronn (DE); Stefan Von Dosky, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 187 days.

(21) Appl. No.: 16/367,469

(22) Filed: Mar. 28, 2019

(65) Prior Publication Data

US 2019/0301908 A1 Oct. 3, 2019

(30) Foreign Application Priority Data

Mar. 28, 2018 (EP) .................... 18164748

(51) Int. Cl.
*G01F 1/69* (2006.01)
*G01N 27/18* (2006.01)
(Continued)

(52) U.S. Cl.
CPC ............... *G01F 1/69* (2013.01); *G01F 1/684* (2013.01); *G01F 1/6845* (2013.01); *G01N 27/18* (2013.01); *G01N 30/64* (2013.01); *G01N 30/66* (2013.01)

(58) Field of Classification Search
CPC .................. G01F 1/69; G01F 1/684
See application file for complete search history.

(56) References Cited

U.S. PATENT DOCUMENTS 4,447,292 A    5/1984   Schuster-Woldan et al.
4,909,078 A    3/1990   Sittier et al.
(Continued)

FOREIGN PATENT DOCUMENTS

CN    104797930    7/2015
DE      3204425    8/1938
(Continued)

OTHER PUBLICATIONS

Machine translation of WO2009153099 (Year: 2009).*
(Continued)

*Primary Examiner* — Walter L Lindsay, Jr.
*Assistant Examiner* — Andrew V Do
(74) *Attorney, Agent, or Firm* — Cozen O'Connor

(57) ABSTRACT

A thermoresistive gas sensor, e.g. for a flow sensor or a thermal conductivity detector, has a lattice with lattice webs, which consist of a semiconductor material arranged in the plane of the lattice in parallel next to one another, wherein the semiconductor material is formed on a plate-shaped semiconductor substrate that extends over a window-like cutout in the semiconductor substrate and forms the lattice, where the semiconductor layer is doped outside the cutout in areas of two ends of the lattice at least over the width of the lattice until it degenerates and/or bears metallizations, where the semiconductor layer further contains a separation structure insulating the two ends of the lattice from one another, in which the semiconductor material is removed or is not doped, and where the lattice webs extend in an S shape and are connected electrically in parallel to achieve a high measurement sensitivity and mechanical stability.

13 Claims, 7 Drawing Sheets

(51) Int. Cl.
*G01F 1/684* (2006.01)
*G01N 30/64* (2006.01)
*G01N 30/66* (2006.01)

(56) References Cited

U.S. PATENT DOCUMENTS

| | | |
|---|---|---|
| 2001/0024820 A1 | 9/2001 | Mastromatteo et al. |
| 2002/0038508 A1 | 4/2002 | Trausch |
| 2004/0056321 A1* | 3/2004 | Parsons ............ H05B 3/265 257/417 |
| 2007/0046925 A1 | 3/2007 | Yamagishi et al. |
| 2008/0184790 A1 | 8/2008 | Ding et al. |
| 2010/0117664 A1 | 5/2010 | Schleicher et al. |
| 2012/0042712 A1 | 2/2012 | Kishi et al. |
| 2015/0247828 A1 | 9/2015 | Ruellan et al. |
| 2015/0377813 A1 | 12/2015 | Biancolillo et al. |
| 2016/0341681 A1 | 11/2016 | Gellert et al. |

FOREIGN PATENT DOCUMENTS

| | | |
|---|---|---|
| DE | 1573098 | 12/1971 |
| DE | 1698048 | 4/1972 |
| DE | 1698050 | 4/1972 |
| DE | 4224518 | 1/1994 |
| EP | 1757910 | 2/2007 |
| EP | 2431737 | 3/2012 |
| EP | 3096133 | 5/2016 |
| EP | 3096137 | 11/2016 |
| WO | WO005/9824 | 10/2000 |
| WO | WO2009/095494 | 8/2009 |
| WO | WO2009/153099 | 12/2009 |
| WO | WO2013/017406 | 2/2013 |

OTHER PUBLICATIONS

Office Action dated Jul. 21, 2021 issued in Chinese Patent Application No. 201910236247.6.

Zhou et al. "Study on Thermal Instability Characteristics of AlN Micro-Hotplate Gas Sensor Array", Chinese Journal of Scientific Instrument; vol. 34, No. 12, pp. 2757-2762, Dec. 15, 2013.

Guan et al. "Design and Optimization of New Coplanar Micro Gas Sensor", Instrument Technique And Sensor; No. 09, 4 pages, Sep. 15, 2017.

Tardy et al. "Dynamic Thermal Conductivity Sensor For Gas Detection", Science Direct, Elsevier: Sensors and Actuators B 98, pp. 63-68, 2004.

* cited by examiner

THERMORESISTIVE GAS SENSOR

BACKGROUND OF THE INVENTION

1. Field of the Invention

The invention relates to gas sensors and, more particularly, to a thermoresistive gas sensor.

2. Description of the Related Art

A thermoresistive sensor or detector is a measurement sensor with an electrical resistor, of which the value changes reproducibly with the temperature. Such resistors are also referred to as thermistors, where a distinction is made between thermistors with a positive temperature coefficient (PTC thermistors) and thermistors with a negative temperature coefficient (NTC thermistors). The PTC thermistors particularly include metals, where platinum and nickel are preferably used, and as non-metallic materials polycrystalline ceramics, based on barium titanite for example, and doped semiconductors, such as silicon, with impurity exhaustion. The NTC thermistors particularly include pure or doped semiconductors outside the range of impurity exhaustion, as well as polycrystalline semiconductors made of metal oxides.

Thermoresistive gas sensors are used, for example, as flow sensors or thermal conductivity detectors in gas analysis or in medical engineering (e.g., anesthesia or respiration devices).

A flow sensor with a sensor element, which is heated electrically and of which the electrical resistance depends on the temperature, is used in thermal anemometry. When a fluid is flowing around the sensor heat is transported into the fluid, which changes with the speed of the flow. By measuring the electrical variables of the sensor element, the flow can be detected and the speed of flow or the mass flow of the fluid can be measured. For measuring alternating flows, in particular, the flow sensor can be arranged in the flow with a further flow sensor arranged upstream and/or downstream from it, so that a crosstalk in the form of an exchange of heat between the flow sensors (switching accordingly with a periodically switching flow) occurs. This can be measured in a way known per se via an electrical measuring bridge, in which the flow sensors are arranged in different bridge branches.

Thermal conductivity detectors are used to detect specific liquid or gaseous substances (fluids) based on thermal conductivity typical for the substance and are particularly employed gas chromatography. To do this, the substances to be detected are conveyed after their chromatographic separation in a duct past a heating element arranged there and electrically heated (e.g., a heating filament made of gold or platinum), where, depending on the thermal conductivity of the substance flowing past, more or less heat from the heating element is dissipated onto the duct wall and the heating element is accordingly cooled down more or less. The cooling down of the heating element changes its electrical resistance, which is detected. If the heating element is regulated to a constant temperature, then the changing electrical heat power is detected. The heating element is usually arranged in a measuring bridge, which contains further resistors and a further heating element in a further duct through which a reference fluid is flowing.

The detection sensitivity of the thermal conductivity detector is all the greater, the greater is the temperature difference between the heating element and the duct wall, where high temperatures adversely effect the service life of the heating element, e.g., of the heating filament. The sensitivity also depends on the specific electrical resistance of the heating filament because, with a predetermined geometry of the heating filament, the overall resistance of the heating filament is specified by this. The greater this overall resistance is, the greater is the detection sensitivity as well. Finally, chemically aggressive gases can attack and corrode the heating filament.

DE 1 573 098 B1, DE 1 698 048 A1, DE 1 698 050 A1, DE 32 04 425 A1 or WO 00/59824 A1 each disclose devices for measuring weak gas flows in, e.g., a gas analysis device, in which two flow sensors are arranged immediately behind one another in the direction of flow of the gas to be measured. The flow sensors each consist of an electrically heatable metal lattice which, as described in greater detail in the foregoing documents, is arranged in a serpentine shape each time. The metal lattices are arranged, together with two supplementary resistors, in a Wheatstone bridge. As DE 1 698 048 A1, DE 32 04 425 A1 or WO 00/59824 A1 show, the metal lattices can be attached within a collection of plates on both sides of an insulating spacer plate and can be covered by cover plates. The plates contain windows for the throughflow of gas, over which the metal lattices extend.

WO 2013/017406 A1 disclose a micro gas sensor for measuring a gas concentration in a measurement gas based, for example, on thermal conductivity. A recess is introduced into a silicon wafer by lithography and etching, where a residual thickness of silicon material remains. This is subsequently structured such that a lattice of webs through which a measurement gas can pass is formed. A metal coating deposited on the silicon wafer is structured such that an electrical conductor runs in a serpentine shape over the cross-sectional surface of the lattice, where there is a contacting option at the rear and front end of the conductor in each case. Optionally, a number of conductors can be routed in parallel on the lattice.

In a similar microflow sensor, known from WO 2009/153099 A1, the metal lattice is replaced by a likewise serpentine-shaped silicon-based lattice, of which the resistance lies in the range of a few kilo ohms, compared to a few ohms when metal lattices are used. This higher resistance value leads to an improved signal-to-noise ratio. Furthermore the greater coefficient of resistance by comparison with metal leads to a higher measurement sensitivity, that is to higher temperature-dependent changes in resistance. The silicon lattice structures are created from crystalline silicon, by using Silicon-On-Insulator (SOI) wafer material, for example.

A similar microflow sensor with two serpentine-shaped lattices is known from DE 42 24 518 A1, which are arranged on a front side and a rear side of a silicon body parallel thereto in the area of a flow duct passing through the silicon body. The lattices can consist of metal or polycrystalline silicon and are arranged in the area of the flow duct as self-supporting lattices or on support structures that are formed from dielectric layers on the front and rear side of the silicon body.

WO 2009/095494 A1 discloses a thermal conductivity detector with an electrically heatable heating filament, which is supported so that a fluid can flow past it in the middle and in the longitudinal direction of a duct and to this end is held at both of its ends on two electrically-conductive supports passing through the duct. In order to obtain a high service life and inertness in relation to chemically aggressive gas mixtures, the heating filament and the supports consist of doped silicon. The doped silicon can be attached to a silicon substrate with an interposed insulation layer of silicon dioxide, where via etching processes by structuring the silicon substrate, the silicon dioxide layer and the layer consisting of doped silicon, the support and the heating filament are formed and the duct is formed in the support plate. In view of the brittleness of silicon, it is proposed in EP 3 096 133 A1, to increase the mechanical stability, to replace the heating filament clamped in by an extremely thin cantilever made of doped silicon.

US 2015/0377813 A1 discloses a gas sensor (thermal conductivity detector) with four heating filaments made of polycrystalline silicon, which are electrically connected to one another in a Wheatstone bridge. Two heating filaments lying diagonally opposite one another in the Wheatstone bridge are arranged in parallel next to one another in a measuring chamber and the two other heating filaments are arranged in a reference chamber.

Likewise, EP 2 431 737 A1 discloses a thermal conductivity detector with four heating elements electrically connected in a Wheatstone bridge. Each heating element consists of a bar made of silicon, which bears a metal coating and runs along and between two walls to form a gap. In order to prevent the bar from flexing because of its thermal expansion and, in doing so, touching one wall or the other, the bar is folded in the middle between the two ends of the bar at a predefined angle; i.e., the bar and the walls or gap accompanying it are v-shaped.

EP 1 757 910 A1 discloses a flow sensor with two heating resistors or two pairs of heating resistors, which are formed out of a planar substrate. The heating resistors are spaced apart from one another in the direction of the flow of gas and extend transverse thereto over an opening in the substrate. Referring to the prior art, a measuring chamber is further disclosed, in which a flow sensor is arranged and which contains trough-shaped gas inlets.

On account of the high electrical resistance of the silicon heating filament, in comparison to heating filaments made of metal (usually gold or platinum), a higher detection sensitivity of the thermal conductivity detector is achieved. However, this is conditional on a higher voltage drop over the heating resistor, if the latter is heated up with a specific heating power to a desired temperature, so that where necessary an intrinsically-safe operation is not possible in areas where there is a risk of explosion. It is therefore proposed in EP 3 096 137 A1 to divide the silicon heating filament into two or more sections, which are arranged in the flow of the fluid physically in series and are connected electrically in parallel.

SUMMARY OF THE INVENTION

In view of the foregoing, it is therefore an object of the invention is to provide specify a thermoresistive gas sensor, which can be used at the same time as a flow sensor or thermal conductivity detector, and that has a high measurement sensitivity and mechanical stability and can be manufactured easily and at low cost.

This and other objects and advantages are achieved in accordance with the invention, by a thermoresistive gas sensor with a flat lattice through which a gas can flow, with lattice webs, which consist of a semiconductor material with a predetermined type of conductivity and which are arranged in the plane of the lattice in parallel next to one another, where the lattice webs are formed to extend in an s shape in the plane of the lattice and are connected electrically in parallel.

In an advantageous embodiment of the inventive thermoresistive gas sensor, a flow sensor contains at least two such gas sensors and also a thermal conductivity detector based on the inventive gas sensor.

The subject matter of the invention is thus a thermoresistive gas sensor with a flat lattice through which a gas can flow with lattices having between several and many lattice webs, in any event more than two lattice webs, which consist of a semiconductor material with a predetermined type of conductivity and which are arranged in parallel with one another in the plane of the lattice, where the lattice webs are formed to extend in an s shape in the plane of the lattice and are connected electrically in parallel.

In the inventive gas sensor, the lattice is not formed in a serpentine shape, but consists of both physically and also electrically parallel webs. The lattice webs with their semiconductor material form temperature-dependent resistors, which are highly-resistive by comparison with metal and therefore, as already mentioned above, make it possible for the sensor to have a high detection sensitivity. However the webs or the resistors formed by them are connected in parallel. As a result, the overall resistance of the lattice and thus the voltage drop over the lattice at a predetermined heat power is low, which makes possible an intrinsically safe operation of the gas sensor in areas at risk of explosion.

Doped semiconductor material particularly comes into consideration as a high-resistance material for the semiconductor layer compared to metal, thus e.g. silicon, which is characterized by its inertness in relation to chemically aggressive gas mixtures. Depending on the doping, a positive temperature coefficient (PTC) or negative temperature coefficient (NTC) can be realized. A good mechanical stability is achieved through the use of monocrystalline semiconductor material, whereby the directional dependence of the module of elasticity and of the piezoresistive coefficient can be utilized.

Although the serpentine-shaped lattices of the conventional gas sensors mentioned at the outset also have parallel lattice sections, these are connected electrically in series, however.

Because of their s-shaped formation, in the inventive gas sensor the lattice webs are not clamped in an over-restrained manner mechanically, so that during heating-up and expansion, they are not deflected in an unchecked manner or even kink. Instead, the distance between the webs is maintained, and they cannot touch each other.

Basically, the lattices can be created in different ways, for example, by etching, laser cutting or 3D printing. Preferably, the semiconductor material is formed as a semiconductor layer on a plate-shaped semiconductor substrate, if necessary with a interposed insulation layer. The semiconductor substrate contains a window-like cutout, over which the semiconductor layer extends and is embodied there in the form of the lattice, so that the lattice webs are connected at their ends to the semiconductor layer on the semiconductor layer on the semiconductor substrate and are connected electrically in parallel via the layer. The resistance of the semiconductor layer connecting the webs is less than that of the webs solely because of the planar extent of the semiconductor layer. In this case, the semiconductor material of the semiconductor layer on the semiconductor substrate, i.e., outside the lattice, in areas that extend at least over the width of the lattice, is preferably doped until it degenerates and thus has almost such good electrical conductivity as metals. As an alternative or in addition, the semiconductor layer can bear a metallization in that area. So that the ends of the lattice or of the lattice webs are not short-circuited by the semiconductor layer on the semiconductor substrate around the window-like cutout, the semiconductor layer contains a separation structure, in which the semiconductor material is preferably removed or is not doped.

For the purposes of parallel connection of the webs of the lattice, the semiconductor layer can additionally bear a metallization in each case outside the window-like cutout in the areas of the two ends of the lattice. The metallizations can be connected to separately embodied contact surfaces for contacting the gas sensor or can form the contact surfaces themselves.

The inventive gas sensor is used in an advantageous manner in a flow sensor, where it is arranged with at least one gas sensor of the same design in a gas flow to be measured such that the lattices lie behind one another and at right angles to the direction of flow.

In this context, it can be of advantage for the above-mentioned two metallizations to extend in a direction by a predetermined amount beyond the width of the lattice, in order to form contact surfaces there, and for the semiconductor substrate (including the semiconductor layer and if necessary insulating layer lying thereon) to contain through openings arranged mirror symmetrically in the other direction to the contact surfaces. This makes it possible for the two gas sensors to be installed offset by 180° to one another, where the contact surfaces of the lower gas sensor are accessible through the openings of the gas sensor lying on top of it and thus both gas sensors can be contacted from one side, the upper side.

Furthermore, the inventive gas sensor is advantageously used as a heating element in a thermal conductivity detector, where it is preferably held between two components, each of which contains a trough open towards the lattice and flush with the window-like cutout in the semiconductor substrate. The two troughs form a measuring space, in which a gas, which is introduced into the measuring space and is conveyed out of the space via gas connections, flows around the heating element or lattice. The two gas connections, usually in the form of small pipes, open out in the direction of the measuring space to the width of the lattice, so that the measurement gas flows over the entire surface of the lattice. Each of the two components can contain one of the two gas connections in each case. To simplify the mechanical design of the thermal conductivity detector and its use both gas connections are preferably located in one of the two components.

So that in the latter cases, in which the two gas connections emerge into one of the two troughs, the measurement gas does not just brush against the webs of the lattice, but flows around them completely, there is preferably provision for the floor of this trough to be curved in a convex shape in the longitudinal direction of the lattice, so that the distance between the lattice and the floor of this trough is smaller in the area of the center of the lattice in the longitudinal direction than in the areas of the two ends of the lattice. In addition, the floor of the other of the two troughs can accordingly be curved in a concave shape in the longitudinal direction of the lattice, so that the distance between the floors of the two troughs remains largely the same and no widening or narrowing of the measuring space occurs in the direction of the flow of the measurement gas.

Despite the fanning out of the flow of measurement gas on entry into the measuring space, different speeds of flow can still be produced over the cross-section of the measurement space or over the width of the lattice. Furthermore, the lattice webs in the middle of the lattice heat up more strongly than the outer webs. The latter problem can be compensated for by the webs having varying cross-sectional surfaces over the width of the lattice, so that the resistance of the outer webs is lower than that of the inner webs. In addition or as an alternative, for homogenization of the temperature and speed of flow in the area of the lattice webs, there can be provision for the floor of the trough with the two gas connections to be curved in a convex shape in the transverse direction of the lattice, so that the distance between the lattice and the floor of this trough in the area of the middle of the transverse direction of the lattice is less than in the edge areas of the lattice and/or that the floor of the other trough is curved in a concave shape in the longitudinal direction, and so that the distance between the lattice and the floor of this trough in the area of the middle of the transverse direction of the lattice is greater than in the edge areas of the lattice.

The inventive thermoresistive gas sensor is equally suited for use in a flow sensor, for example, in a non-dispersive Infrared (NDIR) analysis device or in a gas analyzer working in accordance with the paramagnetic alternating pressure method, and in a thermal conductivity detector for gas chromatography or for analysis of binary gas mixtures. The electrical circuitry of the gas sensor, e.g. in a bridge circuit, is known per se and is not the subject of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For further explanation of the invention reference is made to the figures of drawing, in which.

DETAILED DESCRIPTION OF THE EXEMPLARY EMBODIMENTS

The diagrams in the figures are schematic and not true-to-scale, but can show qualitative size ratios.

The same or similar components in different figures are provided with the same reference numbers.

The invention does not restrict itself in its remarks to the preferred forms of embodiment shown in the figures. Instead a plurality of embodiments is conceivable, which in the solution shown makes used of the basic idea of the invention even with forms of embodiments of a basically different nature.

Figure 1:
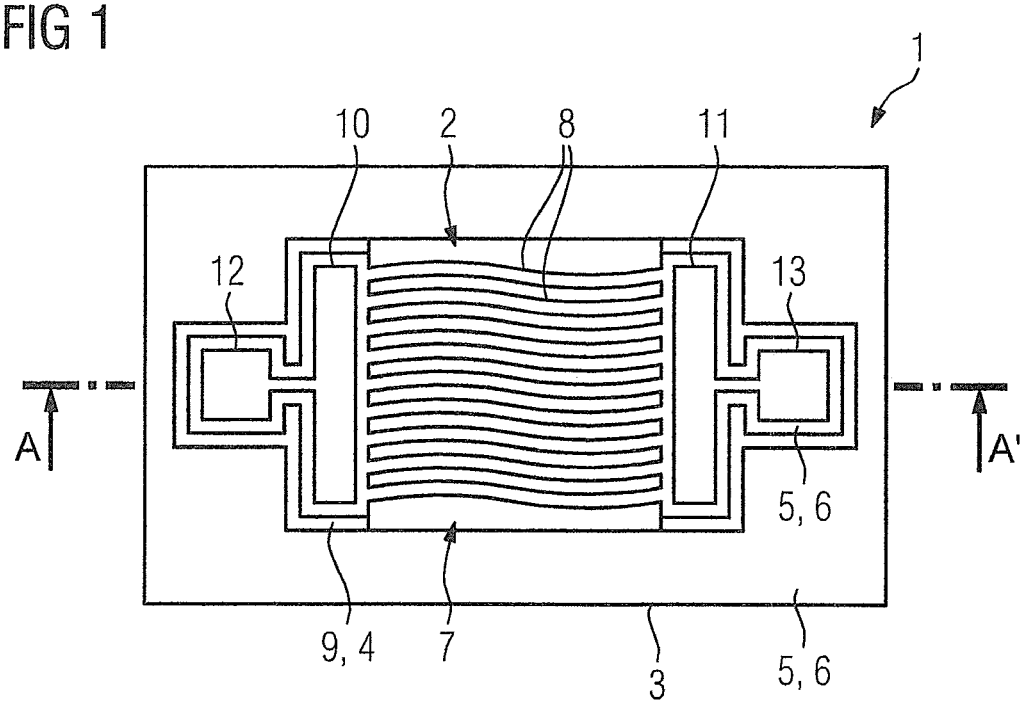
FIG. 1 shows an exemplary embodiment of the inventive gas sensor, with a lattice through which a gas is able to flow, in a view from above.

FIG. 1 shows an exemplary embodiment of the inventive gas sensor 1 with a flat lattice 2 through which a gas is able to flow, in a view from above.

Figure 2:
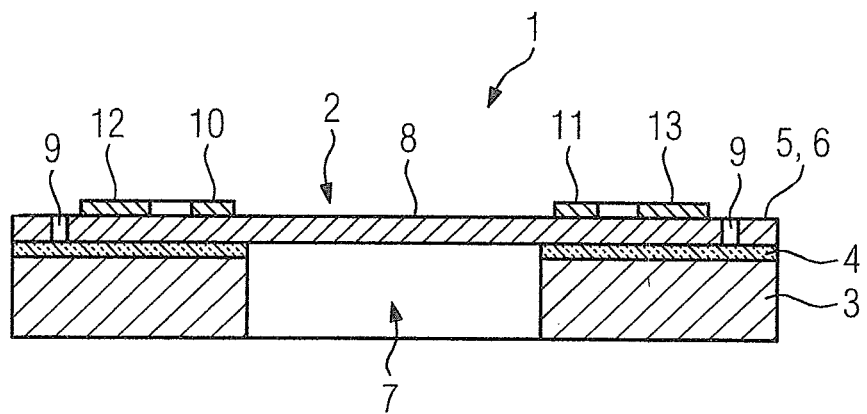
FIG. 2 shows a longitudinal section through the gas sensor depicted in FIG. 1.

FIG. 2 shows the same gas sensor 1 in a longitudinal section along the line AA'.

The gas sensor 1 has a plate-shaped semiconductor substrate 3 made of silicon, for example, to which, with an interposed layer of an insulating layer 4 made of, e.g., silicon dioxide, a semiconductor material 5 in the form of a semiconductor layer 6 is attached. The semiconductor material 5 exhibits a type of conductivity predetermined by doping, for example, where it is conductive with high resistance in comparison to metal. The semiconductor substrate 3 and insulating layer 4 lying above it contain a window-like cutout 7, over which the semiconductor layer 6 extends and is structured there while forming the lattice 2. The lattice 2 consists of a plurality of lattice webs 8, which lie in parallel next to one another in the plane of the lattice and are formed to extend in an s shape. The window-like cutout 7 and the lattice 2 can be created by an etching process. The lattice webs 8 form high-resistance resistors, of which the resistance values are defined by the length of the cross-sectional surface of the lattice webs 8. Each of the webs 8 are connected at their two ends via the semiconductor layer 6 to the semiconductor substrate 3 outside the window-like cutout 7 electrically in parallel. So that the lattice webs 8 are not short circuited by the semiconductor layer 6 around the window-like cutout 7, the semiconductor layer 6 contains a separation structure 9, in which the semiconductor material 5 is removed downwards except for the insulating layer 4. To improve the electrical parallel connection of the lattice webs 8 the semiconductor layer 6, in the areas of the two ends of the lattice 2 outside the window-like cutout 7 is doped over the width of the lattice 2 until it degenerates and bears a metallization 10, 11 in this area in each case. The metallizations 10, 11 can be connected to separately-formed contact surfaces 12, 13 for contacting the gas sensor 1 or can themselves form the contact surfaces.

As already mentioned, the lattice webs 8 consisting of the semiconductor material 5 form temperature-dependent resistors, which are highly resistive by comparison with metal and therefore make a high detection sensitivity of the gas sensor 1 possible. The lattice webs 8 are connected electrically in parallel. Consequently, the overall resistance of the lattice 2 and thus the electrical voltage drop over the lattice 2 at a predetermined heating power is low, which makes possible an intrinsically safe operation of the gas sensor 1 in areas at risk of explosion.

In order to achieve an even temperature distribution over the width of the lattice 2 and to avoid the lattice webs 8 located in the middle of the lattice 2 heating up more strongly than those at the edge of the lattice 2, the outer lattice webs 8 can be formed with a larger cross-sectional surface (width) than that of the inner lattice webs 8.

The cross section of the lattice webs 8 preferably lies in the range of 1 µm×1 µm to 100 µm×100 µm and can amount to 10 µm×10 µm for example. With a size of the window-like cutout 7 of 1 mm×1 mm, the lattice 2 can then have up to 50 webs.

Figure 3:
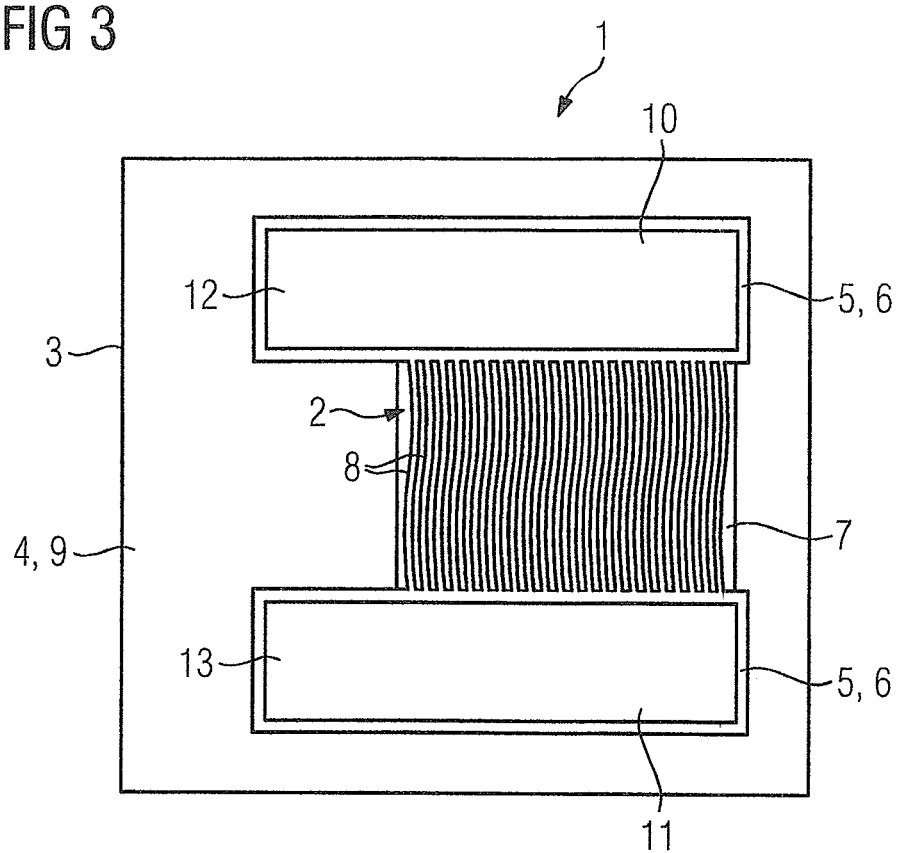
FIG. 3 shows a second exemplary embodiment of the inventive gas sensor, in a view from above.

FIG. 3 shows a further exemplary embodiment for the inventive gas sensor 1' in a view from above. The semiconductor layer 6 on the semiconductor substrate 3 is reduced to two rectangular-shaped island areas on both sides of the window-like cutout 7, between which the parallel s-shaped webs 8 of the lattice 2 run across the window-like cutout 7. Outside the rectangular islands, the semiconductor material 5 is removed from the semiconductor substrate 3 or from the insulating layer 4 lying thereon (separation structure 9). The rectangular islands made of the semiconductor material 5 are provided over almost their entire surface with the metallizations 10 and 11 and extend beyond the width of the lattice 2, in order to form the contact surfaces 12, 13 there.

Figure 4:
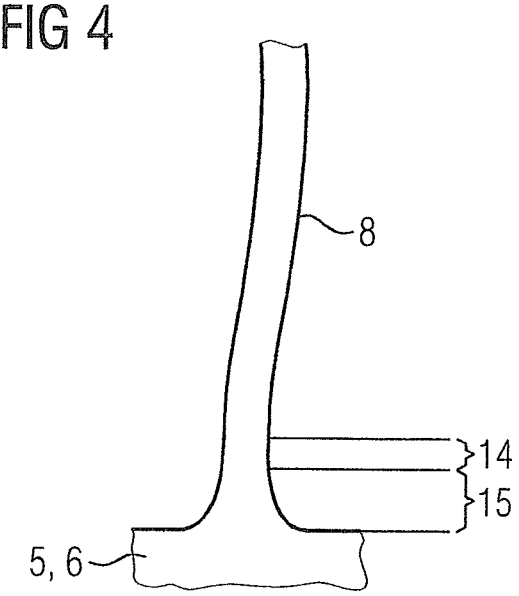
FIG. 4 shows an exemplary embodiment for a lattice web in accordance with the invention.

FIG. 4 shows an exemplary embodiment for the connection of the lattice web 8 to the semiconductor layer 6 on the semiconductor substrate by way of example based on an individual web 8. So that the webs 8 do not fracture when they are being heated up, there is provision for the webs 8, after a first section 14 extending at right angles on the semiconductor layer 6, to expand tangentially in a second section 15 in order to pass into the semiconductor layer 6 at an angle of around 45°, for example.

Figure 5:
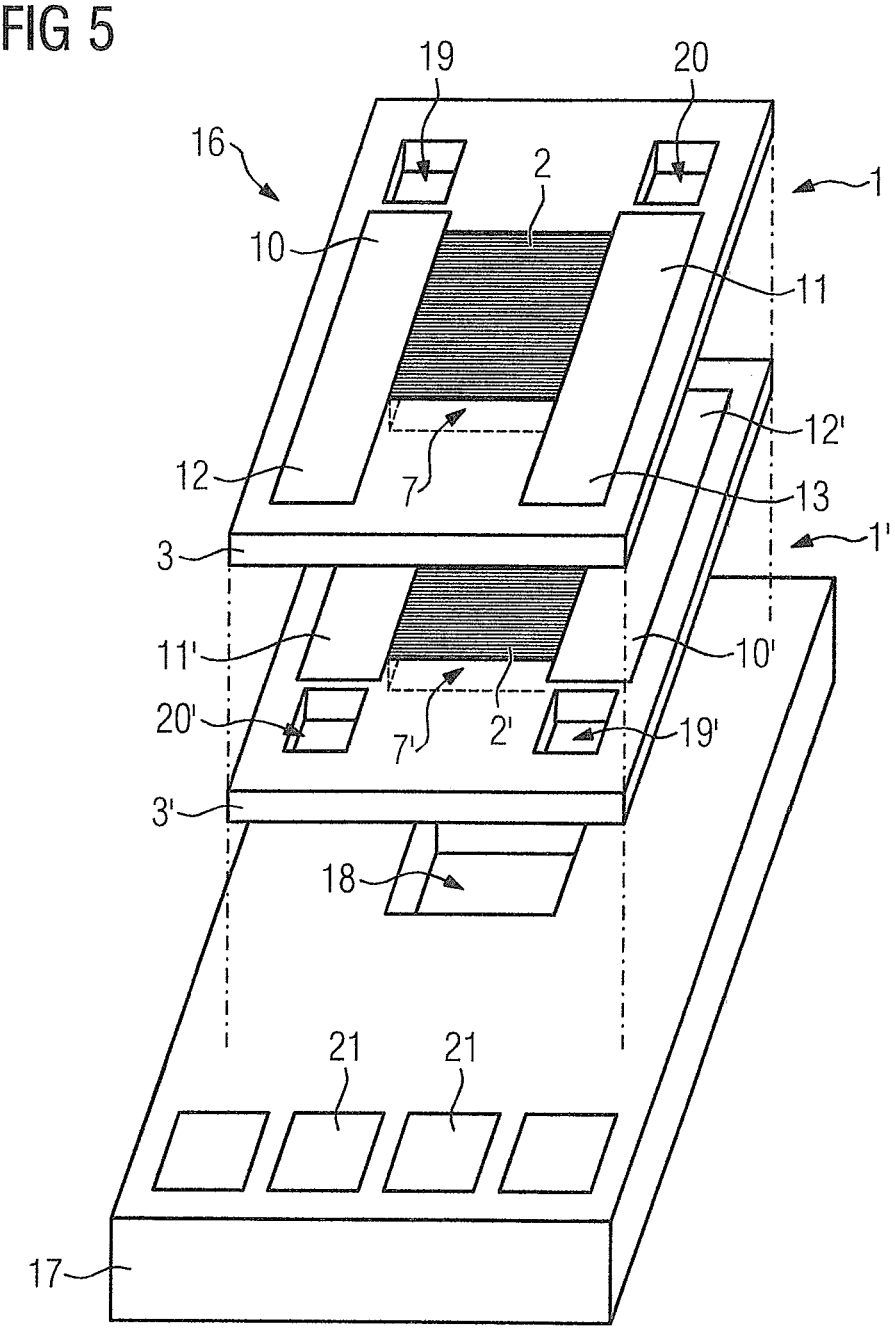
FIG. 5 shows an exemplary embodiment of a flow sensor with two gas sensors in a perspective exploded diagram in accordance with the invention.

FIG. 5 shows a perspective exploded diagram of a flow sensor 16, in which a plate network consisting of two identically-formed gas sensors 1, 1' lying above one another is mounted on a base plate 17, which has a breakthrough 18 flush with the window-like cutouts 7, 7' of the gas sensors 1, 1'. The lattices 2, 2' of the gas sensors 1, 1' lie in parallel to one another at a distance that is given by the thickness of the semiconductor substrate 3. Surface seals or the like can be provided between the plates 1, 1', 17 lying above one another.

As in the example depicted in FIG. 3, in the gas sensors 1, 1' the two metallizations 10, 11, 10', 11' each extend in one direction by a predetermined amount beyond the width of the lattice 2, 2', in order to form the contact surfaces 12, 13, 12', 13' there. In addition, the semiconductor substrates 3, 3' in the other direction contain through openings 19, 20, 19', 20' arranged mirror symmetrically to the contact surfaces 12, 13, 12', 13'. The gas sensors 1, 1' are offset by 180° to one another, so that the contact surfaces 12', 13' of the lower gas sensor 1' are accessible through the openings 20, 19 of the gas sensor 1 lying above it, so that the flow sensor 16 can be contacted from one side. The contact surfaces 12, 13, 12', 13' of the gas sensor 1, 1' are connected here via leads not shown to connection pads 21 on the base plate 17.

Figure 6:
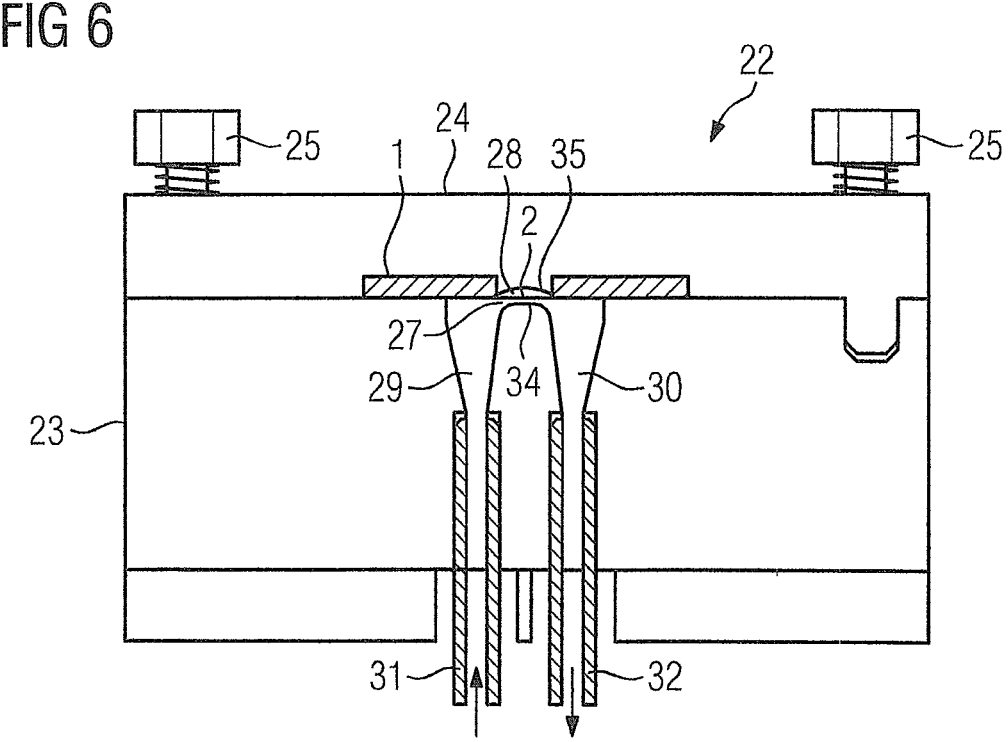
FIGS. 6 and 7 show an exemplary embodiment of a thermal conductivity detector with a gas sensor in a section in the longitudinal direction and in the transverse direction to the lattice in accordance with the invention.
Figure 7:
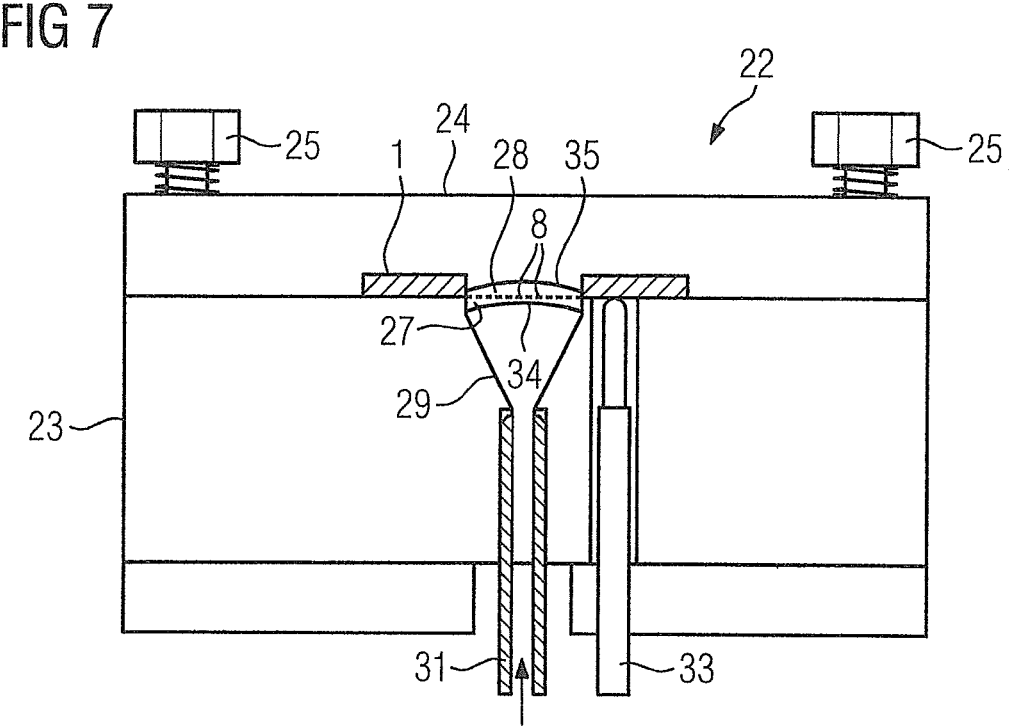

FIG. 6 and FIG. 7 show an exemplary embodiment of a thermal conductivity detector 22 with a heating element formed by the gas sensor 1 once in a section along the lattice 2 or the lattice webs 8 and once in a section transverse to the lattice 2 or the lattice webs 8.

Figure 8:
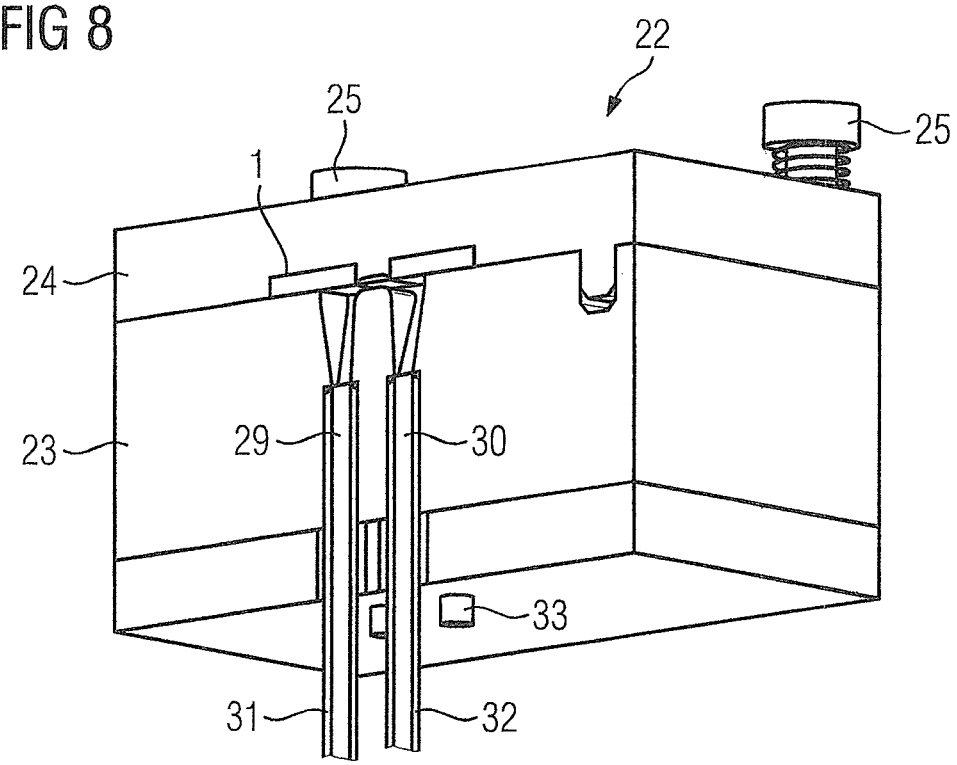
FIGS. 8 and 9 show a perspective longitudinal section of the thermal conductivity detector depicted in FIGS. 6 and 7 in an overall view and as a detailed view in accordance with the invention.
Figure 9:
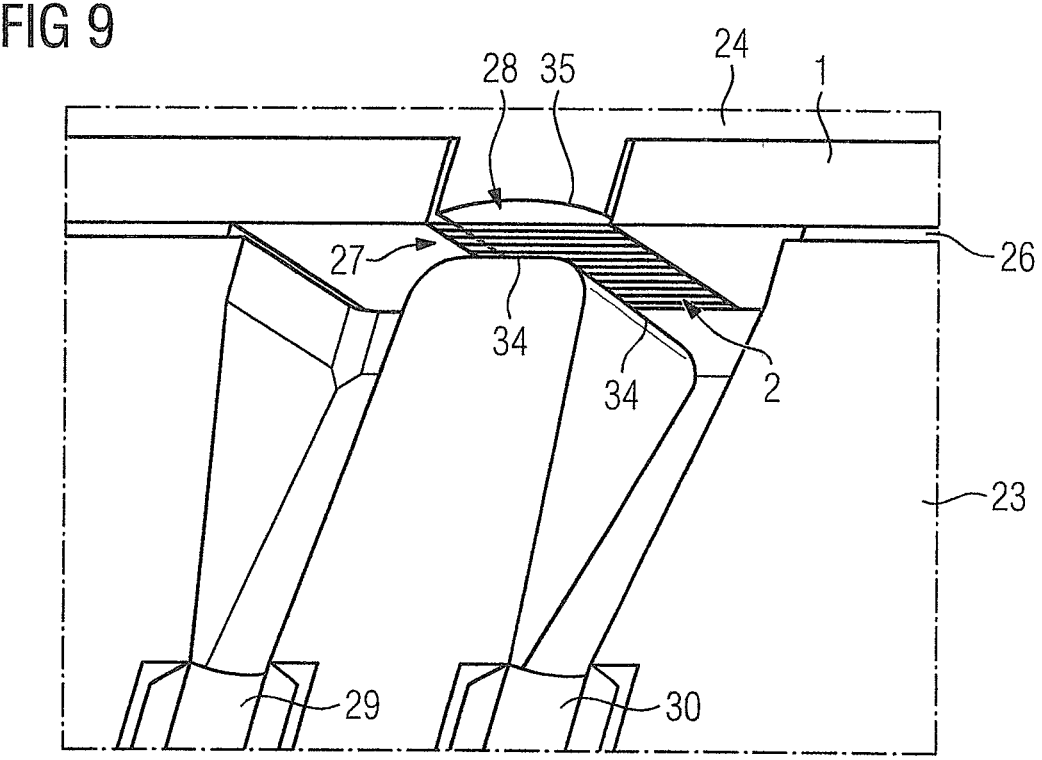

FIGS. 8 and 9 show the same thermal conductivity detector 22 in a perspective longitudinal sectional view, once as an overall diagram and once as a detailed view. The gas sensor 1 is arranged between two components, here a block-like base body 23 (e.g., made of aluminum), and a cover 24 (e.g., made of aluminum or polyether ether ketone (PEEK)), in a cutout of the cover 24 and with the lattice 2 lying facing towards the base body 23. The components 23, 24 are connected to one another via screws 25 and with an intermediate layer of a surface seal or sealing film 26 (FIG. 9). Both the base body 23 and also the cover 24 each contain a trough 27, 28 open towards the lattice 2 and flush with the window-like cutout 7 of the gas sensor 1. The two troughs 27, 28 form a measuring space, in which a measurement gas flows around the lattice 2, which is introduced into the measuring space and conveyed out of this space via two gas connections 29, 30. Basically, each of the two components 23, 24 can contain one of the two gas connections 29, 30 in each case. To simplify the mechanical configuration of the thermal conductivity detector 22 and its use, in the example shown, both gas connections 29, 30 are located in the base body 23 and open out in the areas of the two ends of the lattice 2 into the trough 27. The gas connections 29, 30 are formed, for example, by milling or laser processing in the form of ducts in the base body 23, into which cannulae 31, 32 are inserted. The gas sensor 1 is likewise contacted on the base body 23 side by spring contact pins 33.

As FIGS. 7 and 9 particularly show, the gas connections 29, 30 initially in the form of small tubes, expand in the direction of the trough 27 to the width of the lattice 2, so that there is a laminar spreading or fanning out of the measurement gas and the measurement gas flows over the entire surface of the lattice 2.

So that the measurement gas does not just brush along the webs 8 of the lattice 2 but flows around them completely, the floor 34 of the trough 27 is curved in a convex shape in the longitudinal direction of the lattice 2 or of the lattice webs 8, so that the distance between the lattice 2 and the floor 34 of this trough 27 is smaller in the area of the middle of the longitudinal direction of the lattice 2 than in the areas of the two ends of the lattice 2. In addition, the floor 35 of the other trough 28 in the cover 24 in the longitudinal direction of the lattice 2 is accordingly curved in a concave direction, so that the distance between the floors 34, 35 of the two troughs 27, 28 remains largely the same and no widening or narrowing of the measurement space takes place in the direction of flow of the measurement gas.

Figure 10:
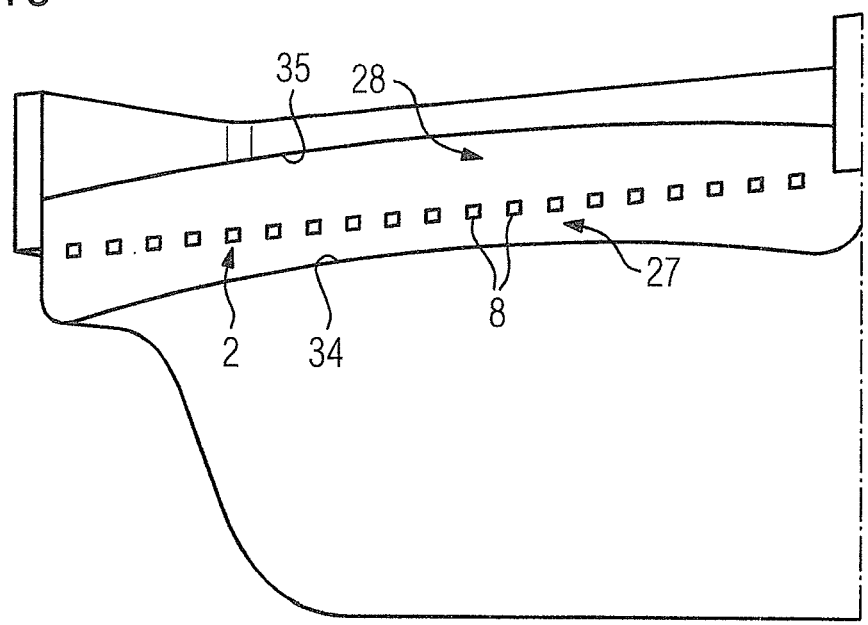
FIG. 10 shows a perspective cross section through a measurement space of the thermal conductivity detector in accordance with the invention.

FIG. 10 shows a perspective cross-section through the measurement space of the thermal conductivity detector 22 formed by the troughs 27, 28.

As can be seen in particular in FIGS. 7, 9 and 10, the floor 34 of the trough 27, into which the two gas connections 29, 30 open out, is additionally curved in a convex shape in the transverse direction of the lattice 2, so that the distance between the lattice 2 and the floor 34 of this trough 27 in the area of the middle lattice webs 8 is smaller than in the areas of the outer lattice webs 8. A homogenization of the temperature distribution of the lattice 2 and the speed of flow of the measurement gas in the area of the lattice webs 8 is achieved by this. In addition, the floor 35 of the other trough 28 in the cover 24 is curved in a concave shape in the transverse direction of the lattice 2 concave, so that the distance between the floors 34, 35 of the two troughs 27, 28 remains largely the same and no widening or narrowing of the measurement space transverse to the direction of the flow of the measurement gases occurs.

Figure 11:
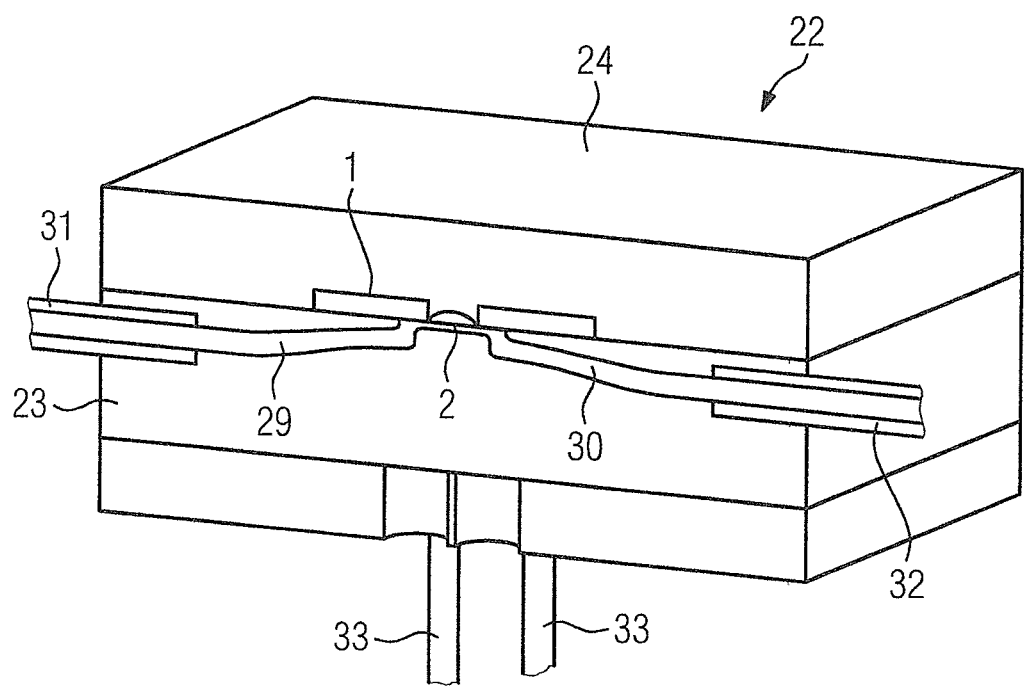
FIG. 11 shows a perspective longitudinal section of a second exemplary embodiment of the thermal conductivity detector in accordance with the invention.

FIG. 11 shows an alternate embodiment of the thermal conductivity detector 22, in which the gas is conveyed in and out at the side via the gas connections 29, 30.

Figure 12:
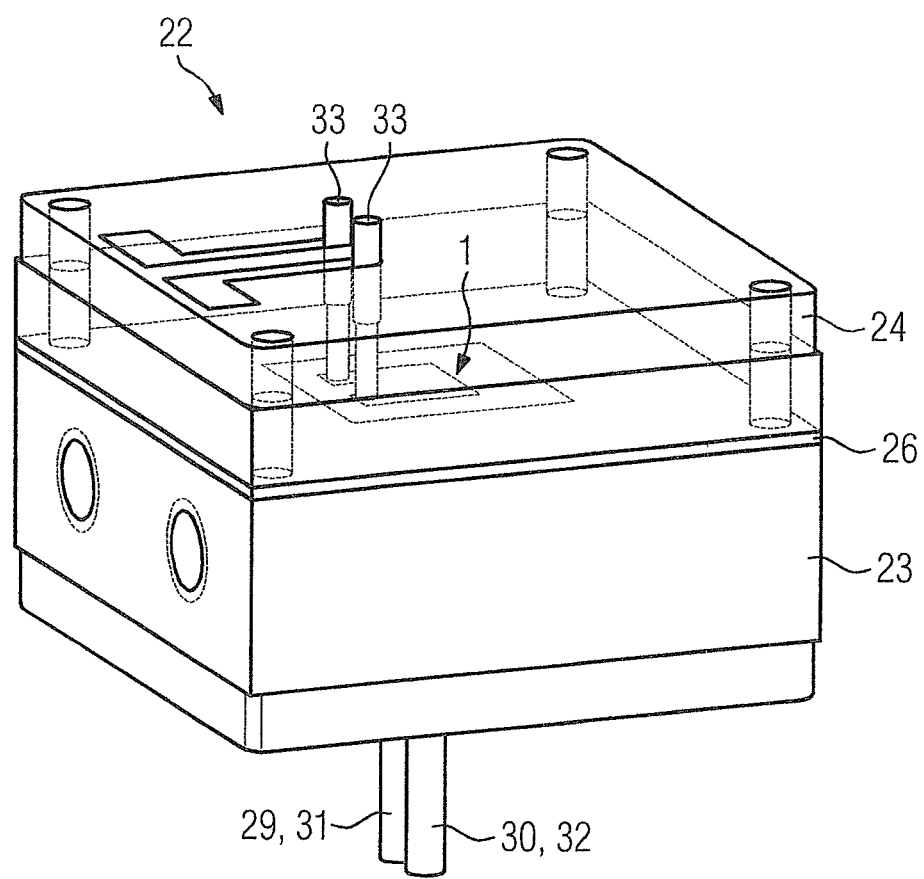
FIG. 12 shows a third exemplary embodiment of the thermal conductivity detector in a perspective view in accordance with the invention.

FIG. 12 shows a further alternate embodiment of the thermal conductivity detector 22, in which the gas connections 29, 30 lie in the base body 23 and the gas sensor 1 is contacted in the cover 24. Electricity and gas supply are thus constructionally separated from one another, which has advantages in respect of the manufacturing and sealing of the thermal conductivity detector 22.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A thermoresistive gas sensor comprising:
a flat lattice through which a gas can flow; and
lattice webs consisting of a semiconductor material having a predetermined type of conductivity and arranged in a plane of the lattice in parallel next to one another;
wherein the lattice webs are formed to extend in a curvilinear s-shape in the plane of the lattice and are electrically connected in parallel;
wherein the semiconductor material is formed as a semiconductor layer on a plate-type semiconductor substrate, which extends over a window-like cutout in the semiconductor substrate, and formed over the window-like cutout as the flat lattice; and
wherein the semiconductor layer outside the window-like cutout contains a separation structure separating two ends of the flat lattice from one another, in which the semiconductor material of the semiconductor layer is removed or is undoped.

2. The thermoresistive gas sensor as claimed in claim 1, further comprising:
an insulating layer formed between the semiconductor substrate and the semiconductor layer.

3. The thermoresistive gas sensor as claimed in claim 2, wherein the semiconductor layer, in areas outside the window-like cutout lying opposite the two ends of the lattice and extending at least over a width of the lattice, is doped until said semiconductor layer at least one of (i) degenerates in each case and (ii) bears a metallization in areas outside the window-like cutout lying opposite the two ends of the lattice and extending at least over a width of the lattice.

4. The thermoresistive gas sensor as claimed in claim 1, wherein the semiconductor layer, in areas outside the window-like cutout lying opposite the two ends of the lattice and extending at least over a width of the lattice, is doped until said semiconductor layer at least one of (i) degenerates in each case and (ii) bears a metallization in areas outside the window-like cutout lying opposite the two ends of the lattice and extending at least over a width of the lattice.

5. The thermoresistive gas sensor as claimed in claim 4, wherein two metallizations extend in one direction by a predetermined amount beyond a width of the lattice, in order to form contact surfaces; and
wherein the semiconductor substrate in another direction contains through-openings arranged mirror-symmetrically to the contact surfaces.

6. The flow sensor with the at least two identically configured thermoresistive gas sensors arranged behind one another in a gas flow to be measured and with their lattices at right angles to a direction of flow in accordance with claim 5, wherein the at least two identically configured thermoresistive gas sensors are offset from one another by 180°, such that contact surfaces of a lower gas sensor are accessible through openings of a gas sensor lying thereon.

7. A flow sensor with at least two identically configured thermoresistive gas sensors arranged behind one another and having lattices at right angles to a direction of flow as claimed in claim 1.

8. A thermal conductivity detector with a thermoresistive gas sensor as claimed in claim 1, wherein the thermoresistive gas sensor is held between two components, which each contain a trough open towards the lattice and flush with the window-like cutout in the semiconductor substrate, wherein one of (i) each trough has a gas connection and (ii) one trough has two gas connections in areas of two ends of the lattice and the two gas connections widen out in a direction towards a respective trough to the width of the lattice.

9. The thermal conductivity detector as claimed in claim 8, wherein one trough has the two gas connections, wherein a floor of the one trough is curved in a convex shape in a longitudinal direction of the lattice, such that a distance between the lattice and the floor of said one trough in a middle area of the longitudinal direction of the lattice is smaller than areas of the two ends of the lattice.

10. The thermal conductivity detector as claimed in claim 9, wherein a floor of another trough is curved in a concave shape in the longitudinal direction of the lattice, such that the distance between the lattice and the floor of this trough, in the area of the middle of the longitudinal direction of the lattice, is larger than in the areas of the two ends of the lattice.

11. The thermal conductivity detector as claimed in claim 8, wherein a floor of another trough is curved in a concave shape in a longitudinal direction of the lattice, such that the distance between the lattice and the floor of the other trough, in the middle area of the longitudinal direction of the lattice, is larger than in the areas of the two ends of the lattice.

12. The thermal conductivity detector as claimed in claim 8, wherein the one trough has the two gas connections; and wherein the floor of said one trough is curved in a convex shape in a transverse direction of the lattice, such that the distance between the lattice and the floor of this trough in the middle area of the transverse direction of the lattice is smaller than in edge areas of the lattice.

13. The thermal conductivity detector as claimed in claim 12, wherein the floor of another trough is curved in a concave shape in the longitudinal direction of the lattice, such that the distance between the lattice and the floor of said other trough in the middle area of the transverse direction of the lattice is greater than in the edge areas of the lattice.

* * * * *